Patented Aug. 30, 1927.

1,640,562

UNITED STATES PATENT OFFICE.

ARTHUR L. BROWN, OF EAST PITTSBURGH, PENNSYLVANIA, ASSIGNOR TO WESTINGHOUSE ELECTRIC & MANUFACTURING COMPANY, A CORPORATION OF PENNSYLVANIA.

CONDENSATION-PRODUCT VARNISH.

No Drawing.    Application filed March 29, 1924.    Serial No. 702,807.

My invention relates to liquid coating compositions and processes of producing them, and especially to the production of varnishes and enamels containing condensation products.

The object of my invention is to provide a liquid coating composition which shall be composed of cheap and readily obtainable materials, and which shall be utilizable as a baking varnish, an impregnating varnish or an air drying varnish.

In my Patent No. 1,212,738, issued January 16, 1917, I have described a process for making a liquid coating composition comprising a condensation product of a phenolic body, formaldehyde, a drying oil and a drier in which the ingredients are chemically combined. The reactions are brought about in the presence of water and a part of the dryer is precipitated after the reaction is completed. The liquid varnish made from this product can be utilized only as a baking varnish, as it does not dry in air to a smooth, tough, elastic film, without the application of heat.

I have discovered that I can produce a varnish that will dry in air from the same materials by a change in the process in which a mixture of a phenol and a drying oil are first acted on by a compound containing an active methylene group in the absence of water other than a part or all of the water resulting from the reaction. The resulting composition is then subjected to the action of the dryer. When the materials are combined in this manner and in the absence of water solutions of the reacting substances, a large amount of dryer will react with the partially formed product, no residue of drier will be formed and the resulting product, when thinned with a suitable thinner, will dry in air in a satisfactory manner.

In practicing my invention I combine cresol, China wood oil, trioxymethylene and a dryer such as lead-manganese tungate or cobalt-linoleate. Three parts of China wood oil and from one to two parts of cresol are mixed cold, an amount of trioxymethylene equal to 30% of the weight of the cresol is added and the mixture is heated to about 100 to 110° C. and allowed to react for about 100 minutes, preferably with a suitable reflux condenser on the apparatus.

The resulting liquid is then heated in the open air to about 120° C., until it becomes clear. This change in appearance is due to the boiling out of the water formed in the reaction. The drier is then added and the mixture is heated to about 200° C., until it is of the desired viscosity. If I use a cobalt-linoleate dryer, I add 3% of the weight of the China wood oil, and if I use a lead-manganese tungate dryer, I add 10% of the weight of the China wood oil.

The product is then thinned with a suitable thinner. For an air drying varnish, I use turpentine, or a turpentine substitute thinner, and the resulting varnish produces a water-proof coating which is smooth and tough and is useful as a wood finishing varnish or a floor varnish. A baking varnish may be prepared by thinning with benzine or with a mixture of kerosene and coal tar naptha. This preparation may be used for impregnating cloth and for covering metal for producing an insulating coating thereon.

Although I have described a specific embodiment of my invention, I do not wish to be limited thereto as materials other than the ones specified may be used. For example, I may use a phenolic body other than cresol and a drying oil other than China wood oil. I may use other water-free substances, containing replaceable methylene groups such as hexamethylenetetramin. Other modifications will suggest themselves to those skilled in the art without departing from the spirit of my invention, the scope of which is defined in the annexed claims.

I claim as my invention:

1. A liquid coating composition comprising a thinned resin of the kind produced by heating together a mixture of cresol, China wood oil and an anhydrous material containing an active methylene group and then heating the resulting material with a drier.

2. A liquid coating composition comprising a thinned resin of the kind produced by heating together an anhydrous mixture consisting of cresol, China wood oil, and a material containing an active methylene group and then heating the resulting material with a drier.

3. The process of preparing a liquid coating composition that comprises heating a mixture of China wood oil and cresol with a material containing an active methylene group for a time sufficient to initially condense said mixture, heating at a higher temperature for dehydrating the same, heating the resulting composition with a drier soluble therein and then adding a thinner.

4. The process of preparing a liquid coating composition that comprises heating a mixture of China wood oil and cresol with an anhydrous material containing an active methylene group, dehydrating the same, heating the resulting composition with a drier and then adding a thinner.

5. The process of preparing a liquid coating composition that comprises heating a mixture of a drying oil and cresol with trioxymethylene, dehydrating, heating the resulting composition with a drier soluble in said dehydrated material and then adding a thinner.

6. The process of preparing a liquid coating composition that comprises heating a mixture of China wood oil and cresol with trioxymethylene, dehydrating the same, heating the resulting composition with a drier and then adding a thinner.

7. The process of preparing a liquid coating composition that comprises heating a mixture of a drying oil and cresol with a material containing an active methylene group to about 110° C., expelling the water formed in the reaction, heating the resulting dehydrated product with a drier to about 200° C. and then adding a thinner.

8. The process of preparing a liquid coating composition that comprises heating a mixture of China wood oil and cresol with a material containing an active methylene group to about 110° C., expelling the water formed in the reaction, heating the resulting de-watered product with a drier at about 200° C. and then adding a thinner.

9. The process of preparing a liquid coating composition that comprises heating a mixture of three parts of China wood oil and one to two parts of cresol with trioxymethylene to about 110° C., expelling the water formed in the reaction, heating the resulting de-watered product with a drier at about 200° C. and then adding a thinner.

10. The process of preparing a liquid coating composition which is capable of drying under atmospheric conditions that comprises heating a mixture of China wood oil and cresol with trioxymethylene, dehydrating the same, heating the resulting composition with a drier and then thinning said liquid with a turpentine.

11. The process of preparing a liquid coating composition which is capable of drying under atmospheric conditions that comprises heating a mixture of China wood oil and cresol with a material containing an active methylene group at about 110° C., expelling the water, heating the resulting product with a drier at about 200° C. and then adding a turpentine thinner.

12. The process of preparing a liquid coating composition which is capable of drying under atmospheric conditions that comprises heating a mixture of three parts of China wood oil and one to two parts of cresol with three-tenths to six-tenths parts of trioxymethylene at about 110° C., expelling the water, heating the resulting product with nine-hundredths to three-tenths parts of a drier at about 200° C. and then adding a turpentine thinner.

In testimony whereof, I have hereunto subscribed my name this 20th day of March 1924.

ARTHUR L. BROWN.